United States Patent

[11] 3,631,711

[72] Inventor Justin L. Kreuzer
   Stamford, Conn.
[21] Appl. No. 695,071
[22] Filed Jan. 2, 1968
[45] Patented Jan. 4, 1972
[73] Assignee The Perkin-Elmer Corporation
   Norwalk, Conn.

[54] COMPARING POSITION AND CONFIGURATION OF AN OBJECT WITH A STANDARD
   1 Claim, 4 Drawing Figs.
[52] U.S. Cl.................................................. 73/67.5 H,
   340/5 H, 350/3.5, 356/109, 181/0.5 NP
[51] Int. Cl............................................... G01n 29/04
[50] Field of Search........................................ 73/67.5 H,
   71.3; 350/3.5; 340/5 H; 356/109, 71

[56] References Cited
   UNITED STATES PATENTS
2,618,968  11/1952  McConnell...................  73/67.7
3,400,363  9/1968   Silverman....................  340/3
3,435,244  3/1969   Burckhardt et al............  356/71 X
   OTHER REFERENCES
Collier, R. J. et al., Application of Moire Techniques to Holography, applied physics letters, vol. 7, No. 8, Oct. 15 1965, pp. 223–225.
Leith, E. N. et al. Holograms: Their Properties and Uses, S.P.I.E. Journal Oct.– Nov. 1965, pp. 3–6.
Brooks, R. E. et al. Interferometry with a Holographically Reconstructed Comparison Beam, applied physics letters, Nov. 1, 1965, pp. 248–249.
Holographic Vibration Analysis Promising for Nondestructive Ultrasonic Testing Laser Focus, Sept. 1966, pp. 31–33.
Electronics Review, Nov. 28, 1966, Vol. 39, No. 24, pp. 37–38.
Horvath et al. Holographic Technique Recognizes Fingerprints, Laser Focus, June 1967, pp. 18–23

Primary Examiner—Richard C. Queisser
Assistant Examiner—John P. Beauchamp
Attorney—Edward R. Hyde, Jr.

ABSTRACT: A method of determining deviations of an object under test from a standard object which includes providing a record, such as a holographic record, of a coherent wave front as modified by impinging on the standard object, illuminating the record with a coherent wave front modified by impinging on the test object, and comparing the focusing of the test object modified wave with the maximum which is achieved when the object corresponds to the standard. In a preferred form the wave modifications are produced by reflection from the objects. The record may be either reflective or transmissive and the coherent radiation may be either acoustic or electromagnetic.

PATENTED JAN 4 1972

INVENTOR.
Justin L. Kreuzer
BY Edward D. Murphy
ATTORNEY.

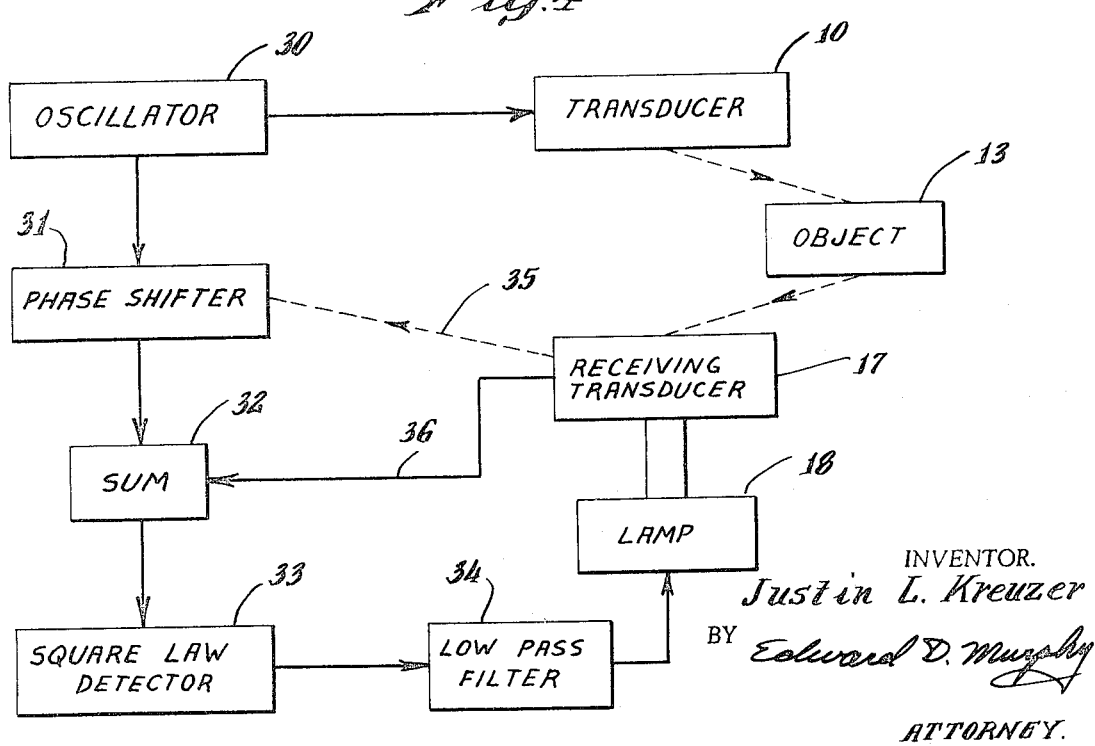

COMPARING POSITION AND CONFIGURATION OF AN OBJECT WITH A STANDARD

This invention is directed to a system for automatically inspecting the configuration of objects and determining variations thereof from a standard.

In the manufacture of many articles, increased speed could be achieved if a higher degree of automation were possible. A limiting factor on this speed is often the need for visual inspection of the articles by an observer who checks each unit for the presence of visible defects. Accordingly, it is desirable to provide an automatic inspection system capable of defective units. In other automated systems involving the assembly of various parts, a system is required which is capable of properly orienting one part relative to another; to accomplish this, it is necessary that an automatic subsystem be provided which can compare the part with a set pattern and produce a corrective signal in case of misalignment. Other situations similarly require apparatus which can compare a given object to a standard pattern and produce an output based on the comparison.

Accordingly, it is an object of this invention to provide a new and improved method for comparing an object with a standard.

Another object of this invention is the provision of a new and improved method for determining variation of an object from a desired position.

It is also an object to provide a new and improved method of determining variation of an object from a desired shape or surface quality.

Another object of this invention is the provision of a new and improved method of detecting flaws in the surface of an object.

Briefly, in accord with one embodiment of this invention, I provide a method for inspection of an object which includes the steps of providing a holographic record of a wave front of coherent radiation as altered by being reflected from or transmitted through an object having desired characteristics such as shape, surface quality or position, illuminating this record with a wave front of coherent radiation as altered by the object under test and comparing the test surface-altered wave as affected by the record with that which is obtained when the object corresponds to the desired characteristics. In a preferred embodiment, coherent acoustic radiation is reflected from the object under test for comparison by means of a hologram of acoustic radiation reflected from the standard object.

Other objects and advantages will become apparent and the invention will be more fully understood from the following detailed description, taken in conjunction with the appended drawings, wherein:

FIG. 4 is a block diagram of an electronic circuit suitable for use in an alternative apparatus for forming a holographic record.

Figure 1:
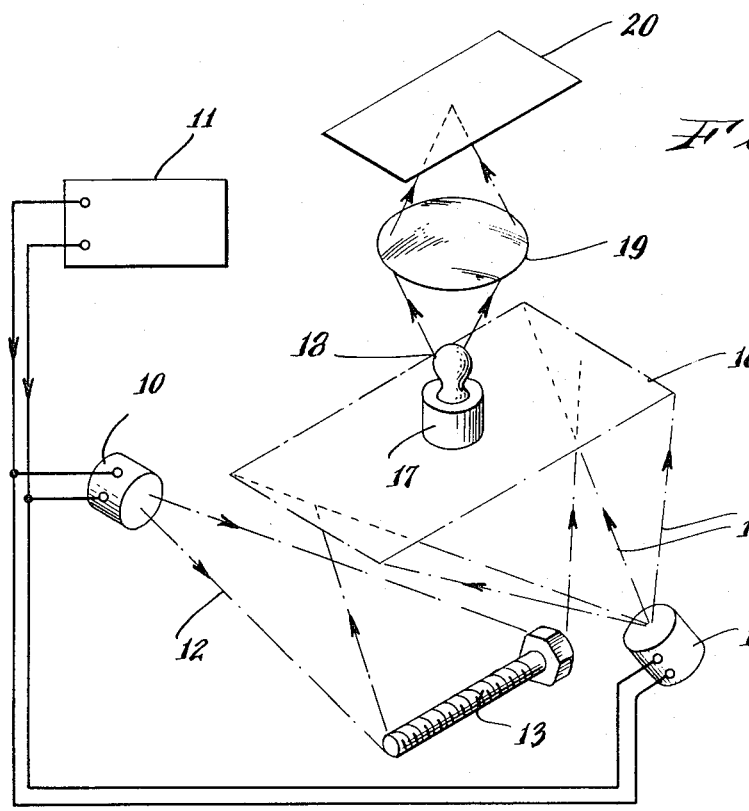
FIG. 1 is a perspective view of apparatus for forming the holographic record used in the method of this invention.
Figure 2:
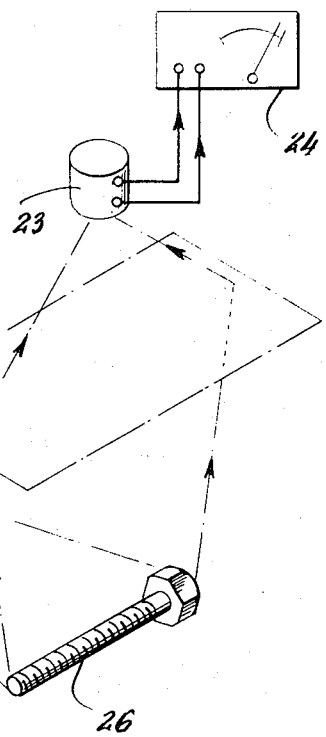
FIG. 2 is a perspective view of exemplary apparatus for performing the method of this invention.
Figure 3:
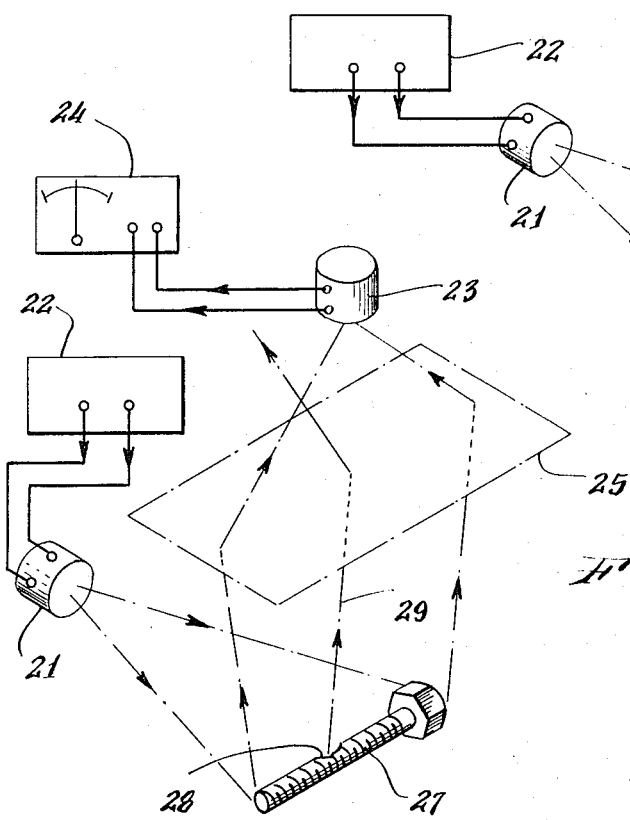
FIG. 3 is a perspective view corresponding to that of FIG. 2 except that the surface under test is defective.

The illustrations of FIGS. 1, 2 and 3, for convenience, are discussed in terms of an application as a defect detection system; however, the same basic method may be applied without difficulty to many other uses, as will be clear to those skilled in the holographic art.

The apparatus illustrated in FIG. 1 comprises a system for providing the holographic record which is used in the method of this invention. Basically, a hologram is a two-dimensional record of the phase and amplitude of a coherent, single frequency beam of radiant energy which has been scattered by an object. To form the record, the scattered beam and a reference beam in phase with it are caused to interfere and a record is made of the interference fringes. Usually, this record comprises a photographic transparency which may thereafter be illuminated by a coherent beam to reproduce a three-dimensional image of the original object.

In accord with this technique, the apparatus shown in FIG. 1 includes means for illuminating the object in question with a coherent beam of radiation, means for producing an interference pattern between the beam reflected from the object and a reference beam and means for recording the interference pattern. The method of this invention is optimized if the wavelength of the radiation used is of the same order of magnitude as the size of the defects expected. For example, in manufacturing processes, the expected defects to be detected by this method might be in the range of from microns to many centimeters. The coherent radiation preferred for many applications is acoustic rather than electromagnetic. In general, it is not intended to limit this invention to any particular range of wavelengths. For example, if the method is to be used for detecting very small defects or for observing surface quality, electromagnetic radiation may be used while for positioning applications, long wavelength acoustic radiation can be used.

The method of forming a hologram of the acoustic wave front shown in FIG. 1 is substantially the same as that disclosed in U.S. Pat. No. 3,559,465. Generally, the apparatus used includes an acoustic emitting transducer 10, such as a piezoelectric crystal driven by an oscillator 11, and arranged to direct a coherent beam 12 onto the object such as bolt 13 which is to be used as the standard. A second acoustic emitting transducer 14 is also driven by the same signal from oscillator 11 so that it generates a coherent reference beam 15 and directs this beam into the same spatial region as is occupied by the reflected beam 12. Thus, an interference pattern is produced over a region which includes the surface included by dotted lines 16. Preferably, the transducers are driven in a coherent pulsed manner.

To provide a holographic record of this pattern, a receiving transducer 17 is provided which is scanned over the area of surface 16 to convert the acoustic interference pattern into a series of electrical signals corresponding to the phase of the acoustic pattern at each point. The surface may be flat or curved as required. Conveniently, this electrical signal may immediately be converted into light intensity variation by means of indicator lamp 18, which is connected to a suitable amplifier, not shown, and which is mounted on the transducer 17. By providing a lens 19 and photographic film 20, a photographic record of the variation in light amplitude, which corresponds exactly to variation of the acoustic interference pattern, is produced. Apparatus for scanning the receiving transducer 17 over the surface 16 is set forth in detail in the aforementioned application of Kendall Preston; in general any drive mechanism which moves the transducer over the desired surface may be used. If the illuminating transducers are pulsed, the transducer 17 may be moved to adjacent points between pulses so as to obtain a clear record of the interference pattern.

The photograph obtained by means of the apparatus of FIG. 1, after suitable development, comprises an acoustic hologram of the object 13 and, as described in the aforementioned copending application of Preston, may be used to produce a image of the object by illumination of the hologram with a coherent beam. The basis of the present invention is the realization that, in such imaging, the hologram is functioning as a lens and, further, that the optical system including that lens is reversible. Accordingly, if the hologram is illuminated by a coherent beam emanating from an identical object, the hologram functions as a lens and focuses the beam to a point. By placing a detector such as a receiving transducer at the focal point, an electrical signal can be obtained corresponding to the quantity of radiation received. Thereafter, if other objects are substituted in the path of the beam, a comparison of the relative quantities of radiation focused can be made. Since the appearance of any defects which are of approximately the same order of magnitude as the wavelength of the radiation used causes a significant quantity of the radiation to deviate from the path it would follow if the object corresponds to the standard, defective objects can readily be identified.

In some cases, the photographic hologram must be converted to another body which will serve to transmit and focus radiation corresponding to the standard wave front and filter out or deflect radiation due to a defect. For example, a suitable lens or mirror may be constructed for filtering and collecting the radiation maxima of the wave front pattern as altered by the test surface or a body having reflective and transmission regions may be used. In the case of acoustic radiation, a metal plate apertured at points corresponding to the maxima of the interference pattern may be produced. The plate then functions as a lens to focus radiation from a test object on a point. It is also noted that the pattern of the wave front as altered by the standard surface which appears at the location of the filter may be generated in such a body in any suitable manner. For example, in the cases of relatively simple surfaces, the characteristics of the shape, radiation and of the relative positions of the system elements may be given to a computer which then computes the shape of the required reflector or the transmission characteristics if a lens is to be provided.

FIGS. 2 and 3 illustrate apparatus for performing the method of this invention and respectively illustrate the function of the system for a good and for a defective test object. The apparatus includes an emitting transducer 21 driven by an appropriate power supply 22 and a receiving transducer 23 coupled to an appropriate utilization means such as meter 24 or a reject mechanism. Unfocused radiation or the ratio might also be detected by using plural detectors. Also included is a filter 25 based on the developed photographic film 20 which was derived from the standard object as described in connection with FIG. 1. In FIG. 2, the object 25 corresponds exactly to the standard and accordingly, the full reflected radiation is focused on the receiving transducer by the hologram and the meter indication is maximum. In FIG. 3, the object 27 includes a defect such as a chip at point 28. Therefore, as indicated by the ray 29, a portion of the radiation is deflected from its normal path and is not focused on the detecting transducer by the hologram. Therefore, the meter indication is less than the maximum.

The method and apparatus described may be applied to a wide variety of test objects and may be used to detect defects of widely varying size by changing the wavelength of the coherent radiation; note that this must be done both in the apparatus of FIG. 1 and in the apparatus of FIG. 2. Other variations in the manner of use may also be made; for example, in some cases such as that of the illustrated bolt, it may be difficult to position the object in precisely the same orientation as the standard. In this case, the object may be rotated until a maximum meter indication is obtained and then this indication may be compared with the value set by the standard.

It is also noted that the body under test may comprise any object which in some way alters the applied coherent radiation, either by reflection, diffraction or refraction. Also, the atmosphere selected may be any suitable medium for the particular radiation used, for example air or other selected gases or, in the case of electromagnetic radiation, a vacuum. In other cases, a liquid may be preferred.

The holographic record prepared as previously described may be modified in any manner required to suit a particular application. For example, if it is determined that only certain areas are likely to be defective, or that only particular features need be observed, selective areas corresponding to these portions of the holographic record may be used.

In essence, this invention is based on the concept of recording a coherent wave front pattern as modified by a standard and subsequently comparing the record with that from a test object. The holographic record described above is unique in its ability to completely record information about the standard and to enable detailed comparison of a test object; therefore, this invention is particularly directed to a method including such a record. An alternative method, which may be useful in cases where less detail is required but where greater speed and ease of alignment are desired, to simply determine the phase and amplitude of the coherent wave front as reflected from the standard, for example by computation from a holographic record, and prepare a lens system which will uniquely focus such a wave front. The system or performing this method would be exactly that illustrated in FIGS. 1 and 2 except that the film 20 from FIG. 1 is used to prepare a lens system, such as a material of varying index of refraction, which is then used in place of film 20 in FIG. 2.

As a further alternative, it is noted that the reference beam transducer 14 of FIG. 1 may be eliminated and its function performed electronically if desired. In this case, the reference wave is derived from the pulses delivered to transducer 10 and is electrically added, after a suitable delay, to the signal produced by the receiving transducer 17. A circuit for performing this method is illustrated in FIG. 4. The oscillator 30 drives the transducer 10 and the same signal is sent to a phase shifter 31. The phase shift produced by the phase shifter should be a function of the position of the receiving transducer, to which it may be mechanically coupled, 35, to produce a phase signal which depends on the position of 17. The desired phase function will control the manner in which the energy is focused in FIG. 2. A summing circuit 32 adds the signals from the phase shifter and from the transducer via electrical connection 36. The square law detector 33 and low-pass filter 34 produce an electrical signal proportional to the desired interference pattern to drive the lamp 18. For additional refinements in the electrical system, reference is made to the aforementioned application of Preston. The mechanical connection between the lamp and the transducer serves to record the lamp output at film locations corresponding to those of the transducer.

In the foregoing description, it has been assumed that the reference beam 15 and the object illumination beam 12 emanated from a point source; in this situation, the resulting hologram functions to focus a beam which also emanates from a point, and which has encountered a perfect test object, onto a point. By suitable addition of lenses, as will be clear to those familiar with holographic techniques, the system may be converted to using collimated beams. In this case, the hologram would produce a collimated beam from a perfect test object. This beam may be measured to determine the comparison by either a multipoint detection system or, by focusing it to a point, by a point detector as described above.

While I have illustrated and described a particular embodiment of my invention, it will be understood that various modifications may be made therein without departing from the spirit of the invention and the scope of the appended claims.

I claim:
1. The method of determining variations of an object under test from a standard object comprising the steps of:
producing a holographic record of a wave front of a beam of coherent acoustic radiation as altered by interaction with said standard object, said holographic record being produced in the form of a radiation mask comprising an apertured metal plate having openings only at the amplitude maxima of said wave front as altered by said standard object;
irradiating said test object with a corresponding beam of coherent acoustic radiation; and
comparing a corresponding wave front of said beam as altered by interaction with said test object with said holographic record by directing the latter wave front through said metal plate which directs substantially all radiation at the points of maximum amplitude in the holographic record through the plate and directs substantially all other radiation in other directions, and by detecting the intensity of radiation passing through the plate.

* * * * *